April 14, 1925.
L. G. KARR
1,533,739
TREE HOLDER
Filed April 2, 1924
2 Sheets-Sheet 2
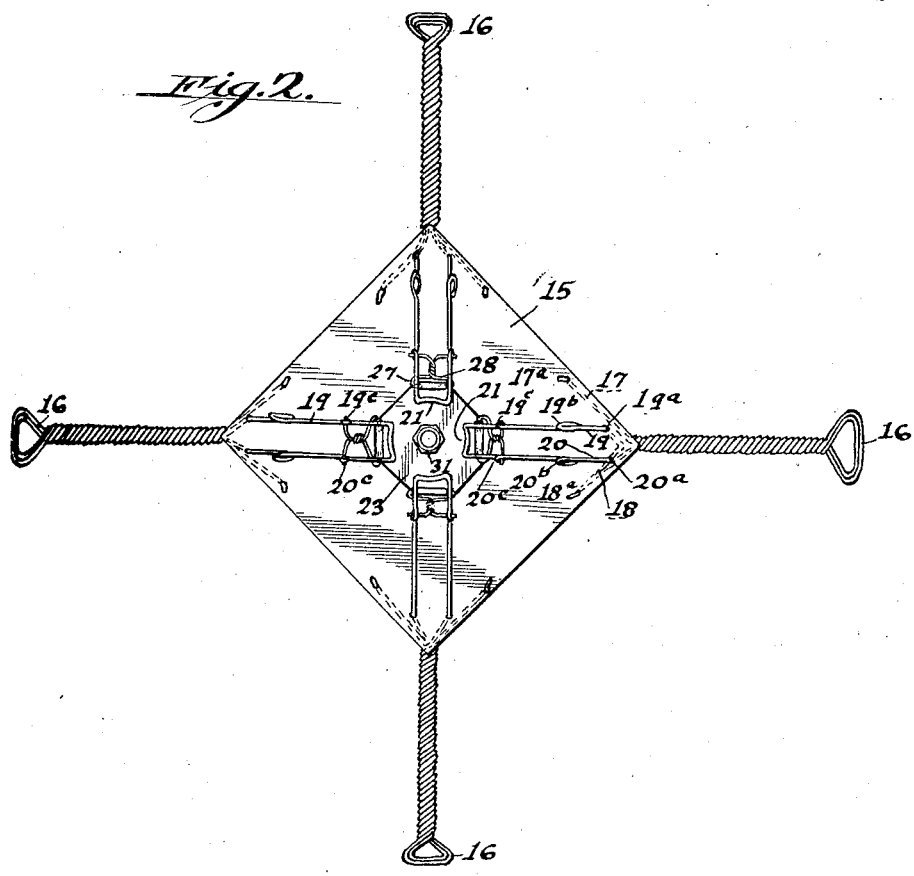
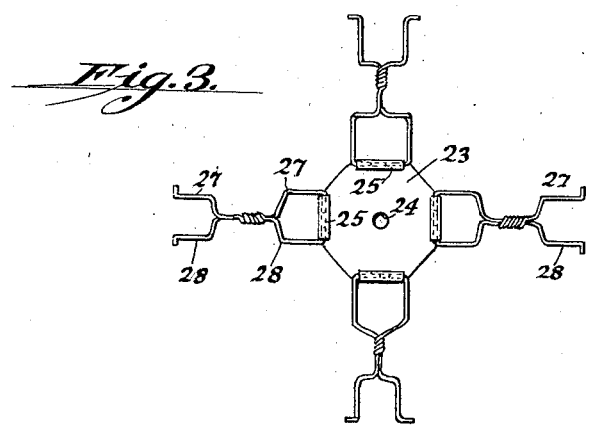
Inventor
LAURENCE G. KARR.
By Hazard and Miller
Attorneys.

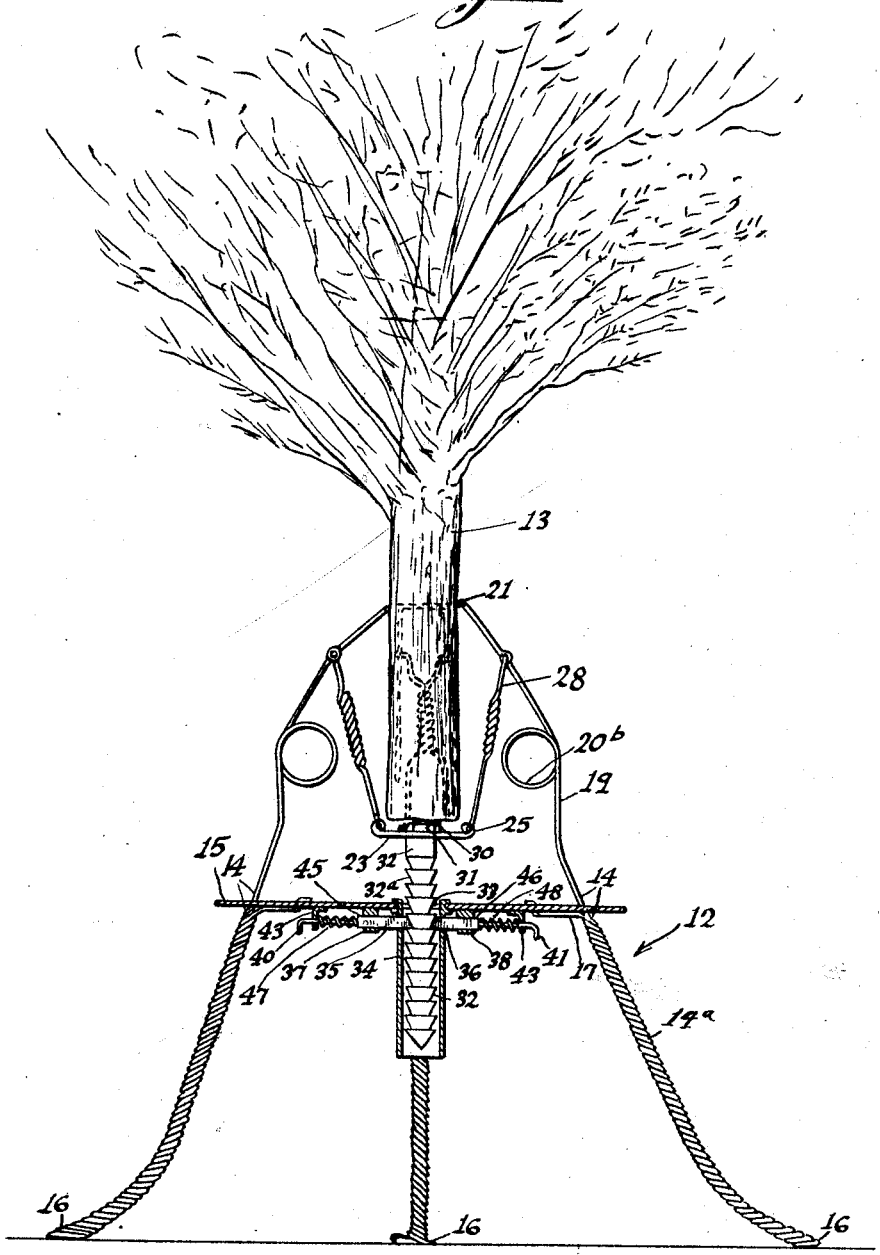

Patented Apr. 14, 1925.

1,533,739

UNITED STATES PATENT OFFICE.

LAURENCE G. KARR, OF LONG BEACH, CALIFORNIA.

TREE HOLDER.

Application filed April 2, 1924. Serial No. 703,628.

*To all whom it may concern:*

Be it known that I, LAURENCE G. KARR, a citizen of the United States, residing at Long Beach, in the county of Los Angeles and State of California, have invented new and useful Improvements in Tree Holders, of which the following is a specification.

This invention relates to holders or supports for cut trees, such as Christmas trees, for example.

An object of this invention is the provision of a simple, economical and efficient tree holder.

Another object of this invention is the provision of an adjustable tree holder.

With the foregoing objects in view, together with such other objects and advantages as may subsequently appear, this invention resides in the construction and arrangement of parts hereinafter described and claimed and illustrated in the accompanying drawings, in which:

Figure 1 is an elevational view of my improved holder, partly broken away and partly in section, showing the same as holding a tree, Fig. 2 is a plan view of Fig. 1, and Fig. 3 is a plan view of a plate which holds the tree, showing in thrown-back position the hinged members from which the plate depends.

Referring to the drawings for a more detailed description thereof, and particularly to the first three figures which show one form of my invention, the numeral 12 indicates the holder generally, in which is positioned the tree 13. The holder 12 comprises four legs 14, each positioned at a corner of a square plate 15, and together support the latter. Each of the legs 14 is of the same construction so that only one of them need be described.

Below the plate 15 the leg 14 consists of four twisted wires 14$^a$, provided with a loop 16 at the bottom, as shown in Fig. 2. Just below the plate 15 two of the wires comprising the wires 14$^a$ of the leg 14, are turned at right angles away from the section 14$^a$ and are separated from each other. These two wires 17 and 18 respectively extend under the plate 15 at right angles to each other, each along one edge of the plate 15, as clearly shown in Fig. 2. The wires 17 and 18 are turned upwardly through the plate 15 and bent over on the upper surface of the plate, as shown at 17$^a$ and 18$^a$ respectively. The other two wires 19 and 20 of the leg 14 are separated from each other just under the plate 15 and pass through the plate at 19$^a$ and 20$^a$ respectively. The wire 19 is looped at 19$^b$ and again at 19$^c$ and the wire 20 is looped at 20$^b$ and again at 20$^c$. The wires 19 and 20 are joined and form a curved grip 21, which is adapted to press against the side of the tree 13.

A square plate 23, clearly shown in Fig. 3, is provided with a central aperture 24 and has each of its four corners rolled up forming loops 25, into each of which is turned the ends of a pair of wires 27 and 28, these wires being thereby hinged to the plate 23. The wires 27 and 28 are twisted together at their intermediate portions, their other end portions being bent, the end portion of the wire 27 being made to engage the loop 19$^c$ and the end portion of the wire 28 being made to engage the end portion of the loop 20$^c$. The plate 23 is thus supported from the legs 14.

A nut 30 on the upper side of the plate 23 engages the upper end 31 of a hold bolt 32 which passes through an aperture 24 in the plate 23. The hold bolt 32 is formed of a series of cones 32$^a$ and passes through an aperture 33 formed in the plate 15 and and through a guide 34 which is tubular and is secured at its upper end to the periphery of the aperture 33. Latches 35 and 36 are disposed opposite to each other and pass through the tubular member 34 to engage the sides of one of the cones 32$^a$. The latches 35 and 36 are slidably supported respectively in members 37 and 38 which are secured to the under side of the plate 15. The latches 35 and 36 have extensions 40 and 41 which are slidably supported in angle irons 43 secured to the under side of the plate 15. The extensions 40 and 41 are each respectively smaller than the latches 35 and 36, so that a shoulder 45 is formed on the outer end of the latch 35 and a shoulder 46 is formed on the outer end of the latch 36.

A coiled compression spring 47 encircles a portion of the extension 40 and is held between the shoulder 45 and an angle iron 43. A coiled compression spring 48 encircles a portion of the extension 41 and is held between the shoulder 46 and an angle iron 43. The compression springs 47 and 48 are compressed to keep the latches 35 and 36 respectively pressed against the side of a cone 32ᵃ.

It will be seen that when the tree 13 is inserted between the gripping members 21 and the butt end of the tree rests on the nut 30, the hold bolt 32 will be pushed down until the gripping members 21 press securely against the sides of the tree and that the gripping members or jaws 21 will hold the tree until the latches 35 and 36 are pulled out from a cone 32ᵃ which they engage.

Various changes may be made without departing from the spirit of the invention as claimed.

What is claimed is:

1. A tree holder comprising a square lower plate having a central aperture, a smaller square upper plate having a central aperture, four legs, one at each corner of the lower plate, each leg comprising a strand of four twisted wires looped at the bottom, two wires of each leg being separated at the under side of the lower plate and bent substantially at right angles to each other and parallel to the lower plate and passing through the lower plate and engaging the upper surface thereof, the other two strands of each leg being separated on the under side of the lower plate, passing therethrough, continuing above the upper plate parallel to each other, each being twice looped and the two strands joined to form a gripping tooth for a tree, means for holding the upper plate, said means comprising twisted wires engaging loops formed on the upper plate by rolling up the corners thereof, each wire having its ends engaging loops in the legs, a hold bolt passing through each of said plates and secured to the upper plate, said hold bolt comprising a series of cones, a guide encircling said hold bolt and spring latches normally engaging a cone of said bolt.

2. A tree holder comprising a lower plate, legs for said plate, said legs having flexible extensions upwardly beyond said plate and forming gripping members for a tree, a plate above the first mentioned plate and adapted to bear the weight of a tree, hinged means for suspending the upper plate from said extensions, a hold bolt passing through said plates and secured to the upper plate, said bolt comprising a series of cones, and spring latches adapted to engage any one of said cones.

3. A tree holder comprising a lower plate, legs for said plate, said legs having flexible extensions upwardly beyond said plate and forming gripping members for a tree, a plate above the first mentioned plate and adapted to bear the weight of a tree, hinged means for suspending the upper plate from said extensions, a hold bolt passing through said plates and secured to the upper plate, said bolt comprising a series of cones, a guide for said bolt and spring latches adapted to engage any one of said cones.

4. A tree holder comprising a lower plate, legs for said plate, said legs having flexible extensions upwardly beyond said plate and forming gripping members for a tree, a plate above the first mentioned plate and adapted to bear the weight of a tree, hinged means for suspending the upper plate from said extensions, a hold bolt passing through said plates and secured to the upper plate, said bolt comprising a series of cones, a guide for said bolt and spring latches adapted to engage any one of said cones, said latches being supported from the lower plate.

5. A tree holder comprising a lower plate, legs for said plate, said legs having flexible extensions upwardly beyond said plate and forming gripping members for a tree, a plate above the first mentioned plate and adapted to bear the weight of a tree, hinged means for suspending the upper plate from said extensions, a hold bolt passing through said plates and secured to the upper plate, said bolt comprising a series of cones, a guide for said bolt and spring latches adapted to engage any one of said cones, said latches being supported from the lower plate and said guide being a tube secured to the lower plate and encircling said bolt.

In testimony whereof I have signed my name to this specification.

LAURENCE G. KARR.